Figure 1:
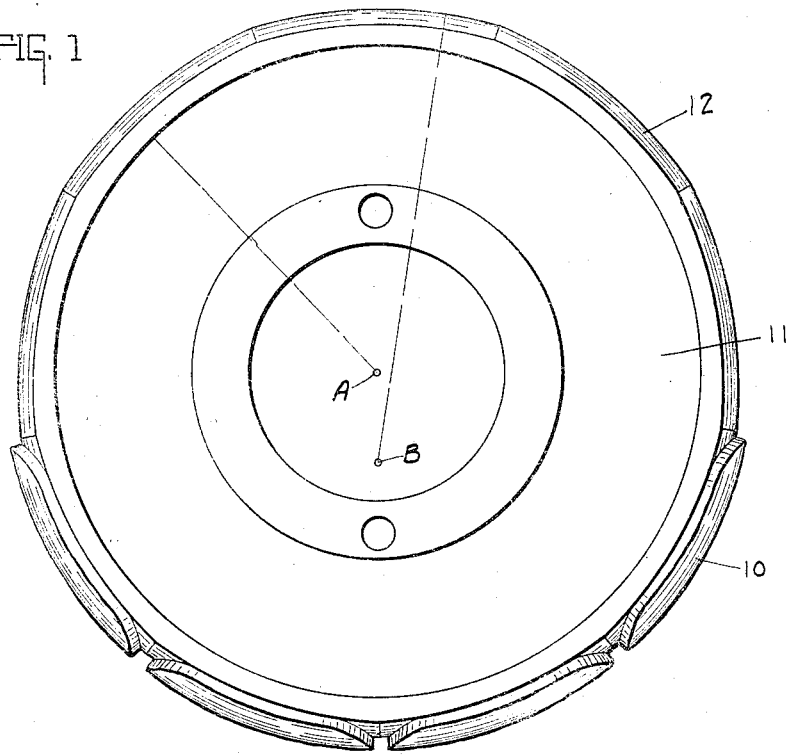

Feb. 19, 1924.

L. W. BUGBEE 1,483,866

PROCESS OF MAKING TORIC LENSES

Filed Feb. 10, 1919   5 Sheets-Sheet 1

INVENTOR.
LUCIAN W. BUGBEE
BY
ATTORNEY.

Feb. 19, 1924.  
L. W. BUGBEE  
1,483,866  
PROCESS OF MAKING TORIC LENSES  
Filed Feb. 10, 1919  5 Sheets-Sheet 2
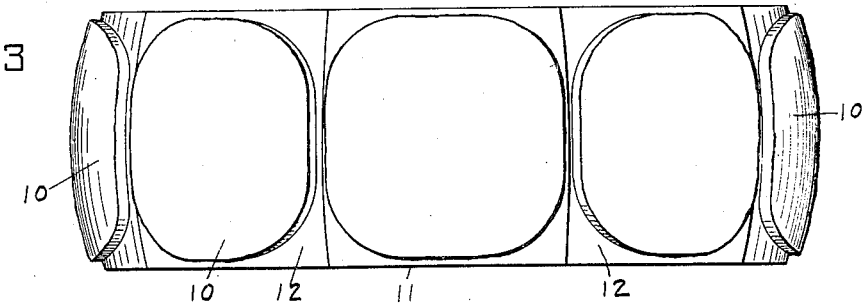
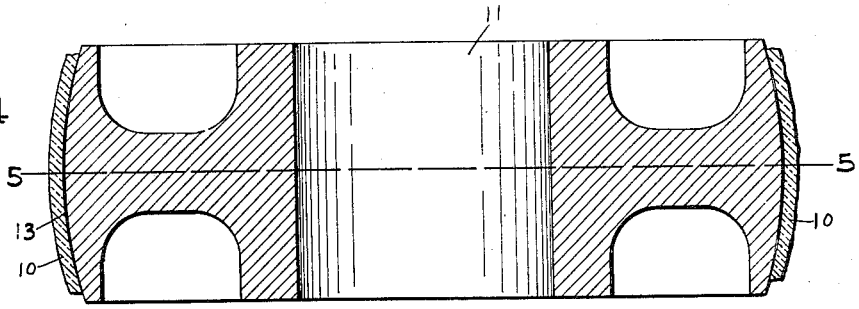
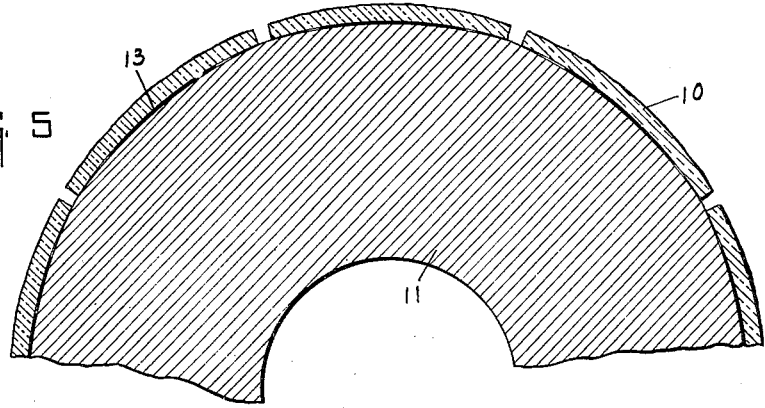
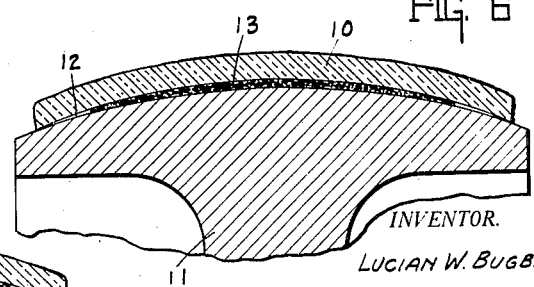
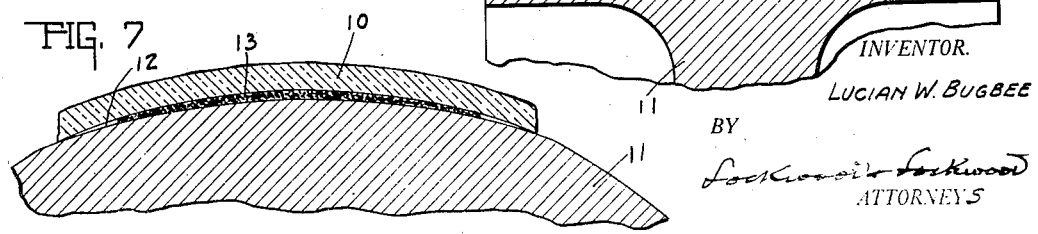
INVENTOR.  
LUCIAN W. BUGBEE  
BY  
Lockwood & Lockwood  
ATTORNEYS Feb. 19, 1924.

L. W. BUGBEE 1,483,866

PROCESS OF MAKING TORIC LENSES

Filed Feb. 10, 1919    5 Sheets-Sheet 3

INVENTOR.
LUCIAN W. BUGBEE
BY
*Lockwood & Lockwood*
ATTORNEYS

Feb. 19, 1924.

L. W. BUGBEE 1,483,866

PROCESS OF MAKING TORIC LENSES

Filed Feb. 10, 1919      5 Sheets-Sheet 4

INVENTOR.
LUCIAN W. BUGBEE.

BY
Lockwood & Lockwood
ATTORNEYS

Feb. 19, 1924. 1,483,866
L. W. BUGBEE
PROCESS OF MAKING TORIC LENSES
Filed Feb. 10, 1919   5 Sheets-Sheet 5

INVENTOR.
LUCIAN W. BUGBEE
BY
*Lockwood & Lockwood*
ATTORNEY.

Patented Feb. 19, 1924.

1,483,866

UNITED STATES PATENT OFFICE.

LUCIAN W. BUGBEE, OF INDIANAPOLIS, INDIANA, ASSIGNOR TO ONEPIECE BIFOCAL LENS COMPANY, OF INDIANAPOLIS, INDIANA, A CORPORATION.

PROCESS OF MAKING TORIC LENSES.

Application filed February 10, 1919. Serial No. 276,190.

*To all whom it may concern:*

Be it known that I, LUCIAN W. BUGBEE, a citizen of the United States, and a resident of Indianapolis, county of Marion, and State of Indiana, have invented a certain new and useful Process of Making Toric Lenses; and I do hereby declare that the following is a full, clear, and exact description thereof, reference being had to the accompanying drawings, in which like letters refer to like parts.

The object of this invention is to improve the quality and finish and also reduce the cost of manufacture of toric lenses.

One feature of the invention consists in forming the inner surfaces of the lens blanks with a uniform curvature, say six diopters and mounting them directly on an accurately shaped and rigid metal holding means for holding the lens blanks while they are being ground and polished. Preferably they are mounted on the metal peripheral surface of a wheel or rotary lens blank holder. This enables all of the blank seating surfaces on the lens blank holder to be uniform and also the lens blank holders as entireties to be identical with each other, whereby they are interchangeable. With this process there is an absolutely solid mounting of the lens blank on the holder so that there is no possibility of the lens blank being improperly mounted or tipped. The result is that all of the lens blanks are mounted exactly alike and will be ground exactly the same thickness, that is, the corresponding parts of all of them will be of the same thickness. There will be no lens blanks thicker than others and no lens blank will be thicker at one edge than at the opposite edge so as to make the lens prismatic.

As stated, the process includes preferably mounting the lens blanks on wheels as lens blank holders and in cutting spots, seats or sections in the peripheral surfaces of the wheel, so that each spot or sectional surface will have substantially the same curvature as the inner surfaces of the lens blanks, whereby the latter will fit accurately on the surface of the lens blank holder.

Another feature of the invention consists in making the spots or seats for the blanks on the wheel substantially rectangular, and it has been very difficult to accomplish this result, yet it is very important, as hereafter will appear.

Figure 2:
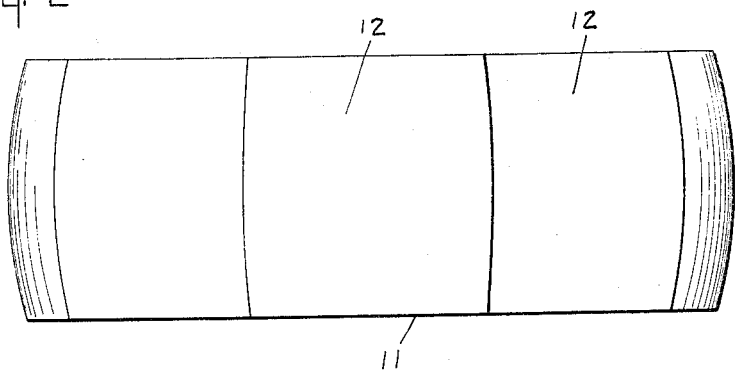
Figure 8:
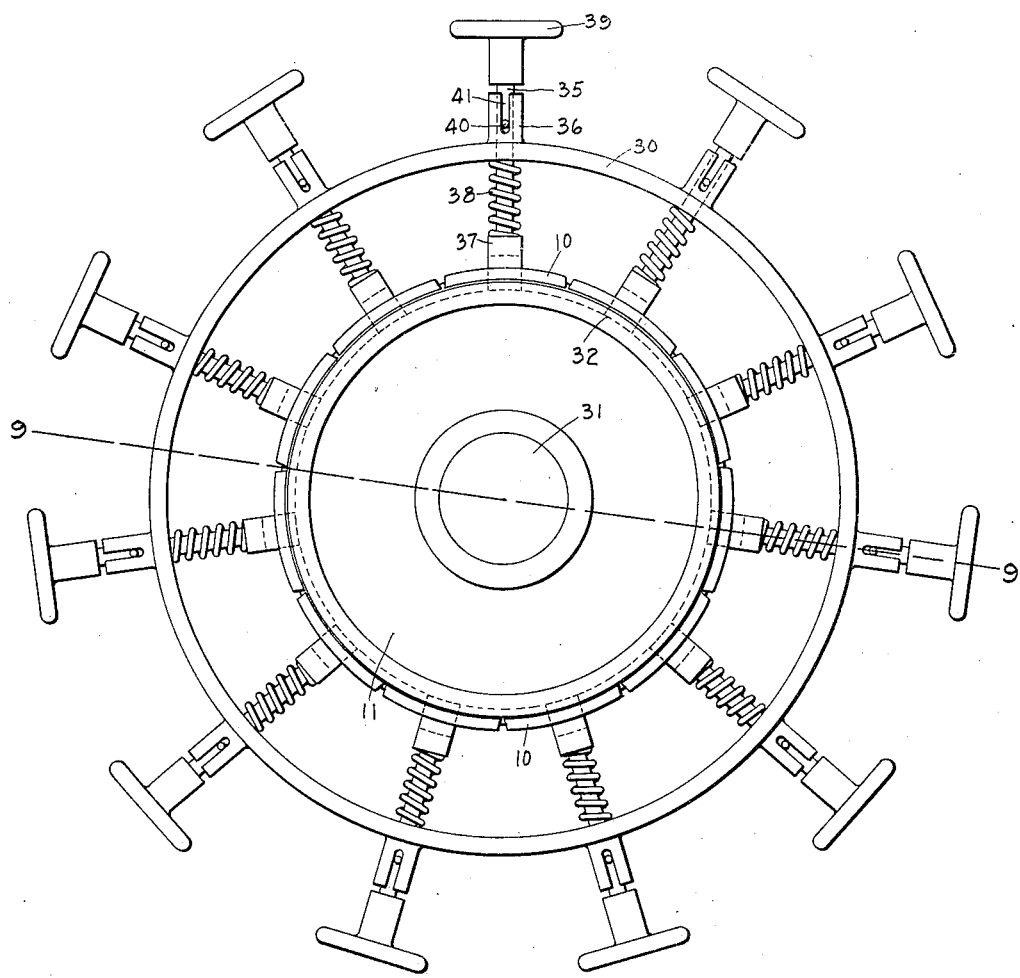
Figure 9:
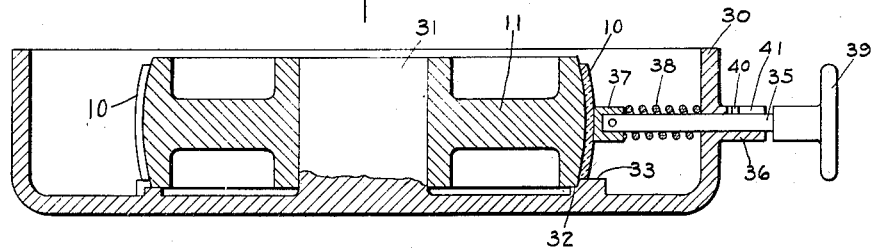
Figure 10:
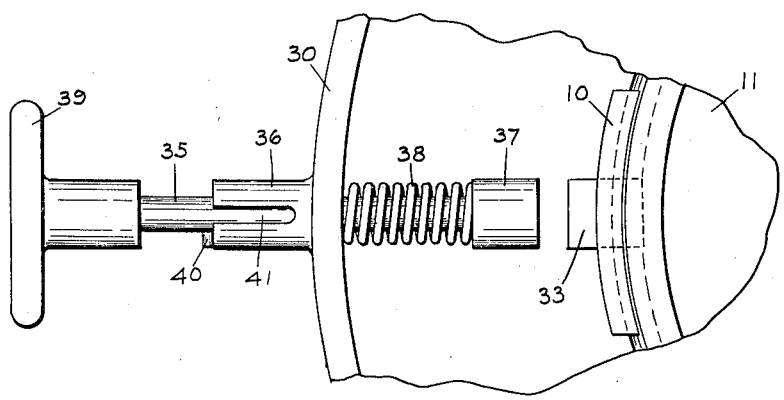
Figure 11:
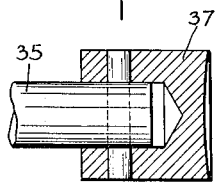
Figure 12:
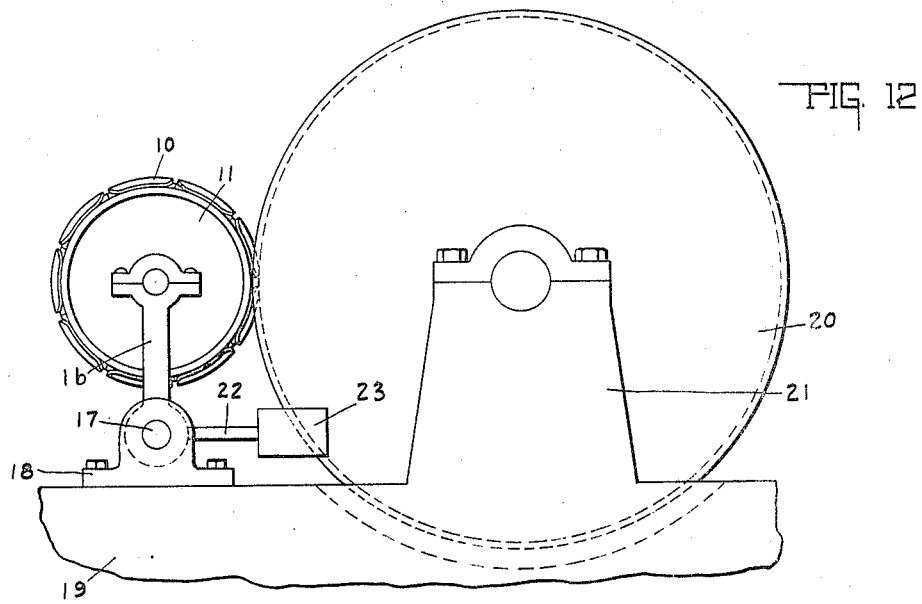
Figure 13:
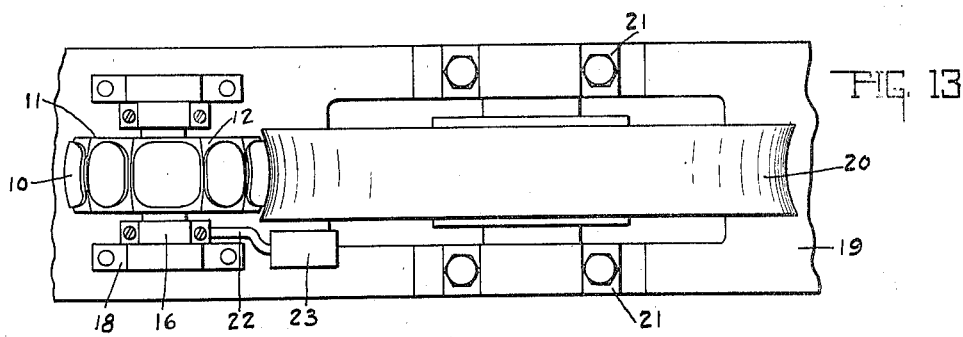
Figure 14:
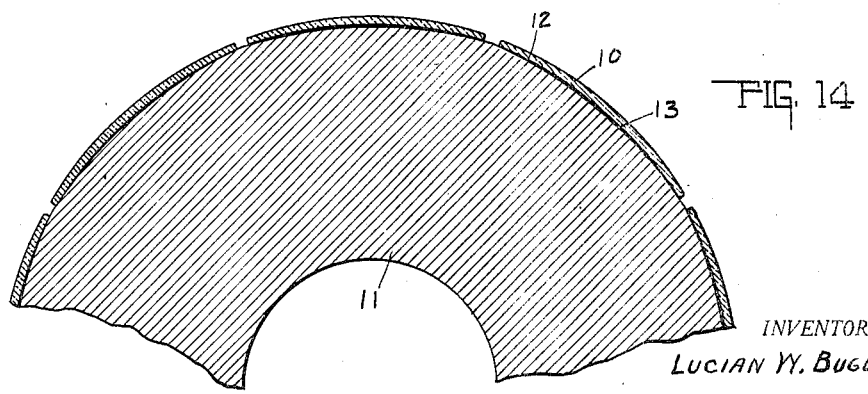

The full nature of the invention will be understood from the accompanying drawings and the following description and claims:

In the drawings, Fig. 1 is a side elevation of a spotting wheel or lens blank holder with some lens blanks mounted thereon. Fig. 2 is a plan view of said spotting wheel. Fig. 3 is a plan view of the spotting wheel with the lens blanks secured thereon. Fig. 4 is a section through the spotting wheel in the plane of its axis. Fig. 5 is a section thereof on the line 5—5 of Fig. 4, the lower half of the wheel being broken away. Fig. 6 is an enlarged view of the right-hand end of Fig. 4. Fig. 7 is an enlarged view of a portion of Fig. 5. Fig. 8 is a plan view of the preferable means for securing or blocking the lens blanks on the wheel or lens blankholder. Fig. 9 is a transverse section on the line 9—9 of Fig. 8. Fig. 10 is an elevation of the inner end of the presser block. Fig. 11 is a portion of Fig. 8 showing the parts in changed position. Fig. 12 is a side elevation of a machine for grinding said lens blanks. Fig. 13 is a plan view thereof. Fig. 14 is the same as Fig. 5 after the lens blanks have been ground.

The first step in the process is to grind and finish the inner surfaces of the lens blanks 10 to a standard curvature, which may be six diopters, that is, the surfaces of the blanks intended to be secured to the lens blank holder, whether the lens blank be plus or minus. The lens blanks herein shown are plus, but the inner surfaces thereof, which are secured to the lens blank holder, are minus six diopters. By having said inner surfaces of the same curvature, the process of manufacturing eye-glass toric lenses will be simplified and cheapened.

The second step in the process consists in making a suitable lens blank holder to which the lens blanks are secured and held while being ground or polished. That shown herein and the preferable form is a wheel 11, although the invention is not necessarily limited to the use of a wheel. The wheel, when first made, should have a uniform peripheral curvature in the rough.

The third step in the process consists in forming on the surface of the lens blank holder, whatever may be its form, spots, seats or sections 12, accurately shaped and curved, on which to secure rigidly and directly the inner surfaces of the lens blanks. On the wheel 11 shown herein such spots, seats or surface sections 12 are cut by proper machinery separately in substantially rectangular form, as seen in Fig. 2, so as to be smooth and accurately surfaced and have an accurate curvature, substantially the same as the inner curvature of the lens blanks, so that the edges of the lens blanks will fit flatly and solidly thereon, touching at all points. However, there should be a slight difference in the curvature of the spot or seat 12 on the lens blank holder and the curvature of the inner surface of the lens blank. In practice the spots or seats are made 5.87 diopters for mounting lens blanks with a six diopter curvature. This leaves a space between the middle portion of the lens blank and the lens blank holder, as seen in Figs. 7 and 8.

The fourth step in the process consists in securing the lens blanks on the lens blank holder. For that purpose a thin film or layer of pitch or other adhesive material 13 is placed on the inner surface of the lens blank, but not materially at the edges thereof, and then the lens blank is placed on the spot or seating surface 12 of the wheel or lens blank holder 11 with the edges of the lens blank resting fully and completely on the metal surface of the wheel or holder, but with the space between the blank and holder having in it said adhesive material, whereby the blank will be rigidly secured and held on the holder. This method of mounting the lens blank is such as to hold it on the holder and yet have the lens blank in direct engagement with line 6, which is with the holder, whereby an accurate and definite mounting of the blanks on the holder will be effected.

Heretofore the wheel for supporting toric lens blanks has been used with a rough peripheral surface and upon such surface a relatively thick layer of pitch was placed and then the spots or seats were impressed in the pitch for receiving and holding the lens blanks to be ground. The troubles with this method of mounting blanks were that it was practically impossible to form the surfaces of the spots or blank seats in the pitch exactly in the same way on the wheel or on different wheels and so that they would be absolutely equidistant from the center of the wheel, or so as to have exactly balanced surfaces, for the impression in the pitch might be deeper on one edge than on the other edge of a spot or seat. Hence, there was danger of the lens blanks tipping when they were mounted or forced on the pitch. The result of these difficulties was that the blanks were not of uniform thickness or shape when finished. Some would be much thinner than others because they were not equidistant from the center of the wheel, and some would be much thinner on one edge than on the other edge thereof, thus making the lens prismatic.

Still another difficulty arose from the variance in the expansion and contraction of the pitch when it became heated during the grinding operation. That variation was so great that it caused the pitch wheel to vary in diameter. It was necessary to warm the wheel and pitch thereon to make the impression in the pitch to form the spots and in preparing a number of these wheels they are liable to be heated to various diameters and, therefore, not have uniform external diameters, so that the lenses produced would vary considerably in thickness.

Another difficulty in the foregoing method was that before the polishing operation was finished, the pitch would become heated and soft and fail to hold the lens blanks in fixed position, and that would defeat the production of accurate lenses. When such blanks are backed on pitch, the liability of the blank to shift when the pitch becomes warm or heated, greatly limits the time for the operation or polishing process.

The foregoing difficulties are remedied by this invention, as the inner surfaces of the lens blanks are accurately ground or polished to a uniform curvature and they are seated directly on the surface of the metal wheel, which has been cut to an exact and accurate curvature, and are equidistant from the center of the wheel. Therefore, the lens blanks secured thereon are of necessity always equidistant from the center of the wheel and are uniformly seated and rigidly mounted on the metal surface of the wheel so that there can be no variance in the mounting of the series of blanks and they will receive absolutely uniform grinding treatment and their positions can never shift because of heat, as they are mounted directly on the metal wheel, which carries away the heat generated in polishing the lenses.

The fifth step in the process is to grind the blanks, and with the wheel-form of lens blank holder the blanks may be ground substantially as shown in Fig. 12. There the lens grinding wheel 11 is mounted on a rocking frame 16 fulcrumed at 17 in a bearing 18 secured to the machine frame 19. A grinding wheel 20 is mounted on bearings 21 extending up from said machine frame. The grinding wheel 20 travels tangentially of the lens blank holder 11. An arm 22 extends from the rocking frame 16 and carries a weight 23 upon its inner end which yieldingly forces the lens blank holder 11 against the wheel 20. Suitable means for driving these wheels is provided, but not here shown. The grinding wheel 20 has its surface concave in cross section so as to grind plus lenses.

When the lenses are ground they are substantially as shown in Fig. 14, where appears a section of the upper half of the wheel 11 corresponding with Fig. 5, which shows the blanks before they are externally ground.

The sixth step in the process consists in polishing the lens blanks while they are still on the lens blank holder 11. The means for carrying out this step in the process is not shown because any suitable polishing method or means known to the art at this time may be employed. However, being mounted as heretofore explained on the lens blank holder, the lens blanks will still be perfectly mounted and presented to whatever polishing means may be employed.

The primary purpose of the space 13 between the inner surface of the lens blank and the surface of the wheel or lens blank holder is to protect the finished inner surface of the lens blank from injury or scratches due to particles of emery or abrading material getting into such space. The spot or lens holding surface could be of identically the same curvature and the lens blank be securely mounted directly on the metal surface thereof, but there would be some danger then of injuring the finished inner surface of the lens blank. That is avoided by making a difference in the curvatures of said parts so as to leave a space large enough to prevent any particle of abrading material from injuring the surface. It is understood that the blanks are large or wide enough so that the edges thereof will not constitute a part of the visual surface and will be cut away in finishing the lens so that such edge surface can be brought down directly into engagement with the metal without danger of the remainder of the surface being injured by any abrading particle that happened to get in between the blank and its holder.

It is observed that the diameter of the wheel determines the spherical curvature of the lens blank and also that one can grind any cylinder curve on any diameter of wheel. On a wheel of given diameter any number of different cylinder curves can be ground. The diameter of the wheel, together with the thickness of the lens determines the power of the curvature in revolution. As the cylinder curve is made stronger, the lens is necessarily made thicker and this calls for a flatter base or equatorial curve. In the type of toric lens commonly used, the base curve is the same for a given cylinder regardless of the thickness of the final lens. By my process when lenses of different thicknesses are ground on a given wheel, the base or equatorial curve is made stronger or weaker according as the lens is made thinner or thicker. Thus, if the radius of curvature of a given wheel is 88.3 mm. and the lens is 1.7 mm. thick, the radius of curvature of the base curve will be 90 mm. If the lens is 3 mm. thick, the radius of the base curve will be 91.3 mm. thick, etc. Thus the old form of toric lens has a base curve that can only be correct for one thickness and from a given rough toric all prescriptions calling for that cylinder must be ground, only one of which can be correct. On the other hand, by my process, the base curve automatically flattens or grows weaker as the lens grows thicker.

It is important that the spots on the wheel be substantially rectangular, as shown, and described herein. The toric lens blanks should preferably be square or approximately so, because such shape is more popular with the trade, but chiefly because it is desirable to have practically a continuous band of glass around the periphery of the wheel, in the grinding. Otherwise, there is danger of aberration in grinding, as for instance, when the grinding wheel is approaching the edge of a circular blank, it will have less glass to grind off and the grinding wheel will dig in more deeply as it approaches the edge of the lens. Then in polishing, the polishing tool should have practically a continuous band of glass on the wheel to travel over; otherwise as it slides off one lens upon the next, the tool will tend to tip up and polish an aberration on the lens surface.

A preferable manner and means for blocking or securing the lens blanks on the lens holding apparatus, or wheel, which is herein shown, is illustrated in Figs. 8 to 11. The wheel 11 is mounted centrally in a metal frame 30 which is, as shown in Fig. 9, dish-shaped, and has a stub 31 extending upward centrally from the base of the frame 30, upon which the wheel is placed, and it centers the wheel within the rim portion of the frame 30, as shown. To more accurately center said wheel, an annular rib 32 is secured on the base of the frame 30 having an inner portion upon which the edge of the wheel is laid and a shouldered portion 33 upon which the lens blanks 10 are placed, when they are being put in place against the periphery of the wheel 11 and before they are secured thereto. This insures every lens blank to be identically located and properly centered with reference to the wheel. A plurality of means is provided extending and movable horizontally through the rim of the frame 30, as shown in Fig. 8, for engaging the outer surface of each lens blank and forcing it inward into tight and positive contact with the metal surface of the lens holder, to insure accurate mounting. In detail, this latter construction, as here shown, consists of a plunger rod 35, which extends through the rim 30 and a tubular extension 36 projecting outwardly therefrom radially, as a means for mounting and riding the rod 35 and holding it in proper horizontal position. This rod has on its inner end a presser block 37 which has preferably a circular end, as shown in Fig. 10, which is concave or formed to fit properly against the surface of the blank. This presser head is forced inward by a spring 38 which surrounds the rod 35 and lies between the block 37 and the rim of the frame 30, as shown in Fig. 8.

With this construction, the presser block forces the lens against the metal surface of the wheel while they are hot. To disengage the block 37 from the blank, it is drawn outwardly by a finger piece 39 on the rod 35 and by turning said rod slightly, it will be held in its outer position by a pin 40 engaging the outer end of the extension 36, as seen in Fig. 11. When it is desired again to move the part into operative position, as shown in Fig. 8, the rod 35 is turned so that the pin 40 will turn and register and enter the slot 41 in said extension 36.

The invention claimed is:

1. In the process of making toric lenses, forming the surface on one side of each of a series of lens blanks with a certain base curvature, mounting the same on the outer periphery of an annular rotary lens blank holder or spotting wheel having the peripheral surface thereof accurately shaped to have a curvature corresponding approximately with said base curvature of the lens blanks, said blanks being secured thereon with their edges directly on and in contact with the surface of said lens blank holder, and then grinding the outer surfaces of said blanks to make them toric by grinding them at a uniform distance from the axis of said lens holder, whereby the lenses of the series will be exactly alike and the outer surfaces be in uniform relation to the base curvature thereof.

2. In the process of making toric lenses, forming the concave surface on one side of each of a series of lens blanks with a certain base curvature, mounting the same on the outer periphery of an annular rotary metal lens blank holder or spotting wheel having convex seats for the blanks accurately shaped to have a plus curvature approximately the same as said minus base curvature of the lens blanks, said blanks being secured thereon with their edges directly on and in contact with the metal surface of said lens blank holder, and then grinding the convex surfaces of said blanks to make them toric by grinding them at a uniform distance from the axis of said lens holder, whereby the lenses will be kept cool and secured in place during the grinding operation and the lenses of the series will be held so that when ground they will be exactly alike and the outer surfaces be in uniform relation to the base curvature thereof.

3. In the process of making toric lenses, forming the concave surface on one side of each of a series of lens blanks with a certain base curvature, mounting the same on the outer periphery of an annular rotary lens blank holder or spotting wheel having the peripheral surface thereof shaped to have a plus curvature approximately the same as but slightly less than said minus base curvature of the lens blanks, said blanks being secured thereon with their edges directly on and in contact with the surface of said lens blank holder by adhesive means between the central portions of said blanks and the lens holder, and then grinding the convex surfaces of said blanks by grinding them at a uniform distance from the axis of said lens holder.

4. In the process of making toric lenses, forming the surface of one side of each of a series of lens blanks with a certain curvature, mounting the lens blanks on a lens blank holder with a plurality of blank holding surfaces each accurately shaped to substantially the same curvature as the inner surfaces of the lens blanks, forcibly pressing said lens blanks against the metal blank holder until their edges directly engage the metal surface thereof, grinding the other surfaces of said blanks while they are held on said lens blank holding means, and then polishing said blanks.

5. In the process of making toric lenses, forming the surfaces on one side of each of a series of lens blanks with a certain curvature, mounting the lens blanks on a lens blank holder with a plurality of blank holding surfaces each accurately shaped to substantially the same curvature as the inner surfaces of the lens blanks, placing adhesive material in the middle portion of the blanks, forcing them under yielding pressure against the metal blank holder so that they will be secured thereto with their edges directly engaging the metal surface thereof, grinding the other sides of said blanks while they are held on said lens blank holding means, and then polishing said blanks.

In witness whereof, I have hereunto affixed my signature.

LUCIAN W. BUGBEE.